United States Patent
Xiong et al.

(10) Patent No.: US 11,532,089 B2
(45) Date of Patent: Dec. 20, 2022

(54) OPTICAL FLOW COMPUTING METHOD AND COMPUTING DEVICE

(71) Applicant: OmniVision Sensor Solution (Shanghai) Co., Ltd, Shanghai (CN)

(72) Inventors: Wenchang Xiong, Shanghai (CN); Shoushun Chen, Shanghai (CN)

(73) Assignee: OMNIVISION SENSOR SOLUTION (SHANGHAI) CO., LTD, Shanghai (CN)

( * ) Notice: Subject to any disclaimer, the term of this patent is extended or adjusted under 35 U.S.C. 154(b) by 169 days.

(21) Appl. No.: 17/083,678

(22) Filed: Oct. 29, 2020

(65) Prior Publication Data

US 2021/0042939 A1 Feb. 11, 2021

Related U.S. Application Data

(63) Continuation of application No. PCT/CN2018/087835, filed on May 22, 2018.

(51) Int. Cl.
*G06T 7/269* (2017.01)
*G06T 7/246* (2017.01)

(52) U.S. Cl.
CPC ............. *G06T 7/269* (2017.01); *G06T 7/246* (2017.01); *G06T 2207/30208* (2013.01)

(58) Field of Classification Search
CPC .......... G06T 7/269; G06T 7/246; H04N 5/351
See application file for complete search history.

(56) References Cited

U.S. PATENT DOCUMENTS

| 2013/0335595 | A1* | 12/2013 | Lee | H04N 5/23229 348/231.5 |
|---|---|---|---|---|
| 2016/0139795 | A1 | 5/2016 | Park et al. | |
| 2018/0262705 | A1* | 9/2018 | Park | H04N 5/37455 |

FOREIGN PATENT DOCUMENTS

| CN | 103516946 A | 1/2014 |
|---|---|---|
| CN | 106462976 A | 2/2017 |
| CN | 106997453 A | 8/2017 |

* cited by examiner

*Primary Examiner* — Amandeep Saini
*Assistant Examiner* — Raphael Schwartz
(74) *Attorney, Agent, or Firm* — IPro, PLLC (57) ABSTRACT

The present disclosure provides an optical flow calculation method for a computing device, including: acquiring an event data flow with a predetermined duration from a DVS, the event data flow including a coordinate position and a timestamp of a triggered event; generating a timestamp matrix in accordance with the coordinate position and the timestamp of the triggered event; scanning elements in the timestamp matrix in a predetermined scanning direction, so as to determine at least one intermediate point in each element in accordance with a value and a gradient of the element in the predetermined scanning direction; and calculating a distance between adjacent intermediate points and a gradient direction, and generating an optical flow matrix in accordance with a calculation result. The present disclosure further provides the computing device.

11 Claims, 5 Drawing Sheets

OPTICAL FLOW COMPUTING METHOD AND COMPUTING DEVICE

TECHNICAL FIELD

The present disclosure relates to the field of data processing technology, in particular to an optical flow calculation method and a computing device.

BACKGROUND

Dynamic Vision Sensor (DVS) is a biologically-mimic vision sensor for simulating a pulse-triggered neuron-based human retina, and it is provided with a pixel unit array. Each pixel unit is capable of independently responding to, and recording, an area where a light intensity changes rapidly, and outputting the recorded data using an event-triggered processing mechanism, so an asynchronous digital event flow, rather than an image frame, is outputted by the sensor. In this regard, the DVS is capable of detecting a high-speed object moving at a speed of up to ten thousand frames per second, without any restraint from an exposure time and a frame rate, and meanwhile reducing a computational burden significantly, so it has a wide application prospect.

Currently, various optical flow calculation methods have been presented on the basis of an event data flow from the DVS. In these methods, a movement direction and a movement speed of each pixel point are calculated in a hyperplane formed through fitting the event data flow in a time-space joint coordinate space. It is necessary to search a space neighborhood and a time neighborhood with respect to each pixel point and fit a local hyperplane, so a current DVS-based optical flow calculation method is complex and time-consuming, thereby it is difficult to meet the requirement on real-time performance.

Based on the above, there is an urgent need to provide an effective optical flow calculation method to meet the requirement on real-time performance.

SUMMARY

An object of the present disclosure is to provide an optical flow calculation method and a computing device, so as to solve or at least alleviate at least one of the above-mentioned problems.

In one aspect, the present disclosure provides in some embodiments an optical flow calculation method for a computing device, including: acquiring an event data flow with a predetermined duration from a DVS, the event data flow including a coordinate position and a timestamp of a triggered event; generating a timestamp matrix in accordance with the coordinate position and the timestamp of the triggered event; scanning elements in the timestamp matrix in a predetermined scanning direction, so as to determine at least one intermediate point in each element in accordance with a value and a gradient of the element in the predetermined scanning direction; and calculating a distance between adjacent intermediate points and a gradient direction, and generating an optical flow matrix in accordance with a calculation result.

In a possible embodiment of the present disclosure, the generating the timestamp matrix in accordance with the coordinate position and the timestamp of the triggered event includes: creating a timestamp matrix with a predetermined size, the predetermined size being determined in accordance with a size of a pixel unit array of the DVS; initializing the timestamp matrix with zero values to acquire an initialized timestamp matrix; searching the coordinate position of the triggered event in the initialized timestamp matrix; and writing the timestamp of the triggered event to the searched coordinate position to acquire the timestamp matrix.

In a possible embodiment of the present disclosure, the predetermined scanning direction is determined in accordance with a movement direction of an object in a field of view, and includes a horizontal scanning direction, a vertical scanning direction, a perspective scanning direction and a rotational scanning direction.

In a possible embodiment of the present disclosure, the determining the at least one intermediate point in each element in accordance with the value and the gradient of the element in the predetermined scanning direction includes: calculating the gradient of each scanned element in accordance with the value of the scanned element one by one in the predetermined scanning direction; and determining the scanned element as the intermediate point when the value and/or gradient of the scanned element meets a predetermined condition.

In a possible embodiment of the present disclosure, the generating the optical flow matrix in accordance with the calculation result includes: creating an optical flow matrix with a predetermined size; initializing the optical flow matrix with zero values to acquire an initialized optical flow matrix; searching a coordinate position of the intermediate point in the initialized optical flow matrix; and writing a value of the corresponding intermediate point to the searched coordinate position to generate the optical flow matrix.

In a possible embodiment of the present disclosure, the determining the scanned element as the intermediate point when the value and/or gradient of the scanned element meets the predetermined condition includes: determining the scanned element as a first intermediate point when a product of the gradient of the scanned element and a gradient of an adjacent element is smaller than zero; determining the scanned element as a second intermediate point when the value of the scanned element is not equal to zero and a value of the adjacent element is equal to zero; and marking the first intermediate point and the second intermediate point as intermediate points.

In a possible embodiment of the present disclosure, the calculating the distance between the adjacent intermediate points and the gradient direction includes: selecting two adjacent intermediate points without any zero point therebetween as an intermediate point pair; with respect to each intermediate point pair, calculating a distance between the two intermediate points in accordance with coordinate positions of the two intermediate points; calculating the gradient direction of the intermediate point pair and determining a gradient symbol value in accordance with the gradient direction; and determining a product of the distance between the two intermediate points in the intermediate point pair and the gradient symbol value as a value of the two intermediate points in the intermediate point pair.

In a possible embodiment of the present disclosure, the generating the optical flow matrix in accordance with the calculation result further includes: creating an optical flow matrix with a predetermined size; initializing the optical flow matrix with zero values to acquire an initialized optical flow matrix; searching coordinate positions of two intermediate points in an intermediate point pair in the initialized optical flow matrix; and writing a value of the two intermediate points to the searched coordinate positions of the two intermediate points and a coordinate position between the two intermediate points.

In a possible embodiment of the present disclosure, the writing the timestamp of the triggered event to the searched coordinate position includes, when one coordinate position corresponds to a plurality of timestamps in the event data flow, writing the timestamp in the plurality of timestamps with a maximum value to the coordinate position.

In a possible embodiment of the present disclosure, the writing the timestamp of the triggered event to the searched coordinate position includes, when one coordinate position corresponds to a plurality of timestamps in the event data flow, writing the timestamp in the plurality of timestamps with a minimum value to the coordinate position.

In a possible embodiment of the present disclosure, the determining the gradient symbol value in accordance with the gradient direction includes: when the gradient direction is greater than zero, determining that the gradient symbol value is +1; and when the gradient direction is smaller than zero, determining that the gradient symbol value is −1.

In another aspect, the present disclosure provides in some embodiments a computing device, including one or more processors, a memory, and one or more programs stored in the memory and executed by the one or more processors. The one or more programs include instructions for implementing the above-mentioned optical flow calculation method.

In yet another aspect, the present disclosure provides in some embodiments a computer-readable storage medium storing therein one or more programs including instructions. The instructions are executed by a computing device so as to implement the above-mentioned optical flow calculation method.

According to the optical flow calculation scheme in the embodiments of the present disclosure, the timestamp matrix may be generated in accordance with the event data flow, vector tracking may be performed on the timestamp matrix in the predetermined scanning direction, the distance between the adjacent intermediate points and the gradient direction may be calculated, and then the optical flow matrix may be generated in accordance with the calculation result. In other words, the optical flow matrix may be calculated merely through traversing the elements in the timestamp matrix. As a result, it is unnecessary to perform a local, complex plane-fitting calculation process for pixels as compared with a conventional method, thereby to improve the operability and the real-time performance.

BRIEF DESCRIPTION OF THE DRAWINGS

In order to achieve the above and related objects, some descriptive aspects will be described in conjunction with the following description and drawings, and these aspects indicate various ways capable of practicing a principle of the present disclosure. All aspects and equivalent aspects thereof shall fall within the scope of the present disclosure. The above and other objects, features and advantages will become more apparent on the basis of the drawings in conjunction with the following description. Same reference signs represent a same component or element.

DETAILED DESCRIPTION

The present disclosure will be described hereinafter in more details in conjunction with the drawings and embodiments. The following embodiments are for illustrative purposes only, but shall not be used to limit the scope of the present disclosure. In contrast, the following embodiments are provided so as to facilitate the understanding of the present disclosure.

Figure 1:
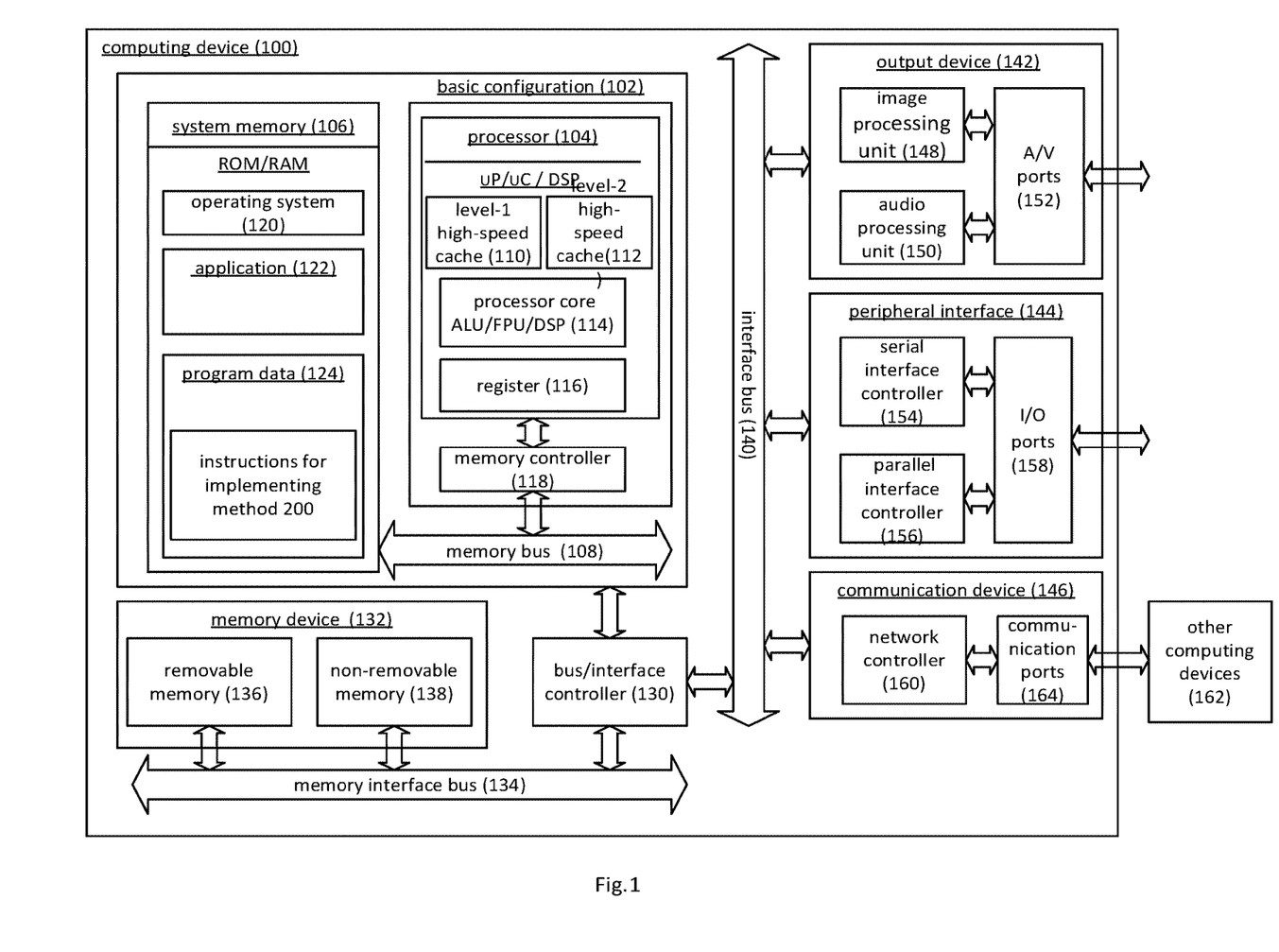
FIG. 1 is a schematic view showing a computing device 100 according to one embodiment of the present disclosure.

FIG. 1 is a block diagram of a computing device 100. In a basic configuration 102, the computing device 100 typically includes a system memory 106 and one or more processors 104. A memory bus 108 may be used for the communication between the processor 104 and the system memory 106.

Depending on a desired configuration, the processor 104 may be of any type, and it may include, but not limited to, microprocessor (μP), microcontroller (μC), Digital Signal Processor (DSP), or a combination thereof. The processor 140 may include one or more levels of high-speed caches (e.g., a level-1 high-speed cache 110 and a level-2 high-speed cache 112), a processor core 114 and a register 116. The processor core 114 may include an Arithmetic Logical Unit (ALU), a Float Point Unit (FPU), a DSP core, or a combination thereof. A memory controller 118 may be used together with the processor 104, or in some embodiments of the present disclosure, the memory controller 118 may be an internal component of the processor 104.

Depending on a desired configuration, the system memory 106 may be of any type, and it may include, but not limited to, volatile memory (e.g., Random Access Memory (RAM)), non-volatile memory (e.g., Read Only Memory (ROM) or flash memory), or a combination thereof. The system memory 106 may include an operating system 120, one or more applications 122, and a program data 124. In some embodiments of the present disclosure, the application 122 may be operated using the program data 124 on the operating system. In some embodiments of the present disclosure, the computing device 100 is configured to execute an optical flow calculation method 200, and the program data 124 may include instructions for implementing the method 200.

The computing device 100 may further include an interface bus 140 for the communication between various interface devices (e.g., an output device 142, a peripheral interface 144 and a communication device 146) and the basic configuration 102 via a bus/interface controller 130. The output device 142 may include a graphical processing unit 148 and an audio processing unit 150, which are configured to facilitate the communication with various external devices, e.g., display and loudspeaker, via one or more A/V ports 152. The peripheral interface 144 may include a serial interface controller 154 and a parallel interface controller 156, which are configured to facilitate the communication with the external devices, such as input devices (e.g., keyboard, mouse, pen, voice input device and image input device) or the other devices (e.g., printer or scanner) via one or more I/O ports 158. The communication device 146 may include a network controller 160, which is configured to communicate with one or more other computing devices 162 using a network communication link via one or more communication ports 164.

The network communication link may be an instance of a communication medium. Usually, the communication medium may be embodied as a computer-readable instruction, data structure or program module in a modulated data signal such as carrier or the other transmission mechanism, and it may include any information delivery medium. For the so-called modulated data signal, one or more data sets of the modulated data signal or the modulated data signal itself may be changed through encoding information in a signal. As a non-restrictive example, the communication medium may include a wired medium (e.g., wired network or private wire network), or a wireless medium (e.g., sound, Radio Frequency (RF), microwave, infrared (IR) or the like). The term "computer-readable medium" may include both the memory medium and the communication medium.

The computing device 100 may be a personal computer, e.g., desk-top computer or laptop computer. Of course, the computing device 100 may also be a part of a small-size portable (or mobile) electronic device, e.g., cellular phone, digital camera, PDA, Personal Media Player, wireless network browser, heat-mounted device, application-specific device, or a device including the above functions, which will not be particularly defined herein.

In the optical flow calculation, usually a conventional image sensor is replaced with a motion sensor. The motion sensor is capable of responding to an event representing a relative brightness change, so data outputted by the motion sensor may be used to record and exhibit movement information in a better manner than the conventional image sensor. In one implementation mode, a dynamic vision sensor may be arranged in a scene, and when no object moves in the scene, the dynamic vision sensor does not display any content. However, once the movement of the object in the scene has been detected (i.e., there is a light change), a time-sequence pixel event data flow for dynamic pixels (i.e., pixels whose brightness has changed) may be outputted. In other words, the event data flow has recorded pixel information about the event (i.e., the pixels in the DVS whose brightness has changed) in a chronological order.

Figure 2:
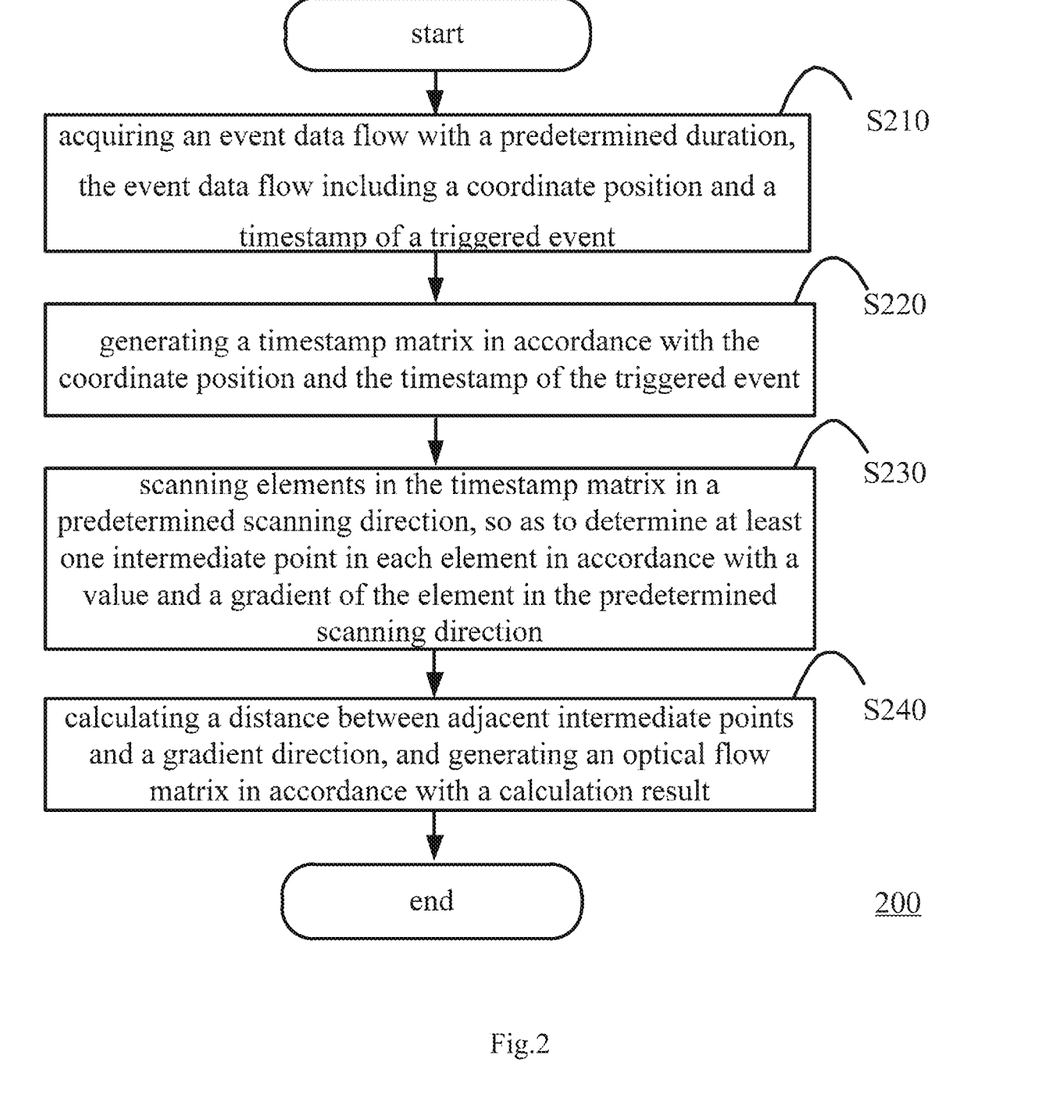
FIG. 2 is a flow chart of an optical flow calculation method according to one embodiment of the present disclosure.

According to the embodiments of the present disclosure, the event data flow from the DVS may be processed to acquire an optical flow matrix. FIG. 2 is a flow chart of an optical flow calculation method 200 according to one embodiment of the present disclosure.

Figure 3:
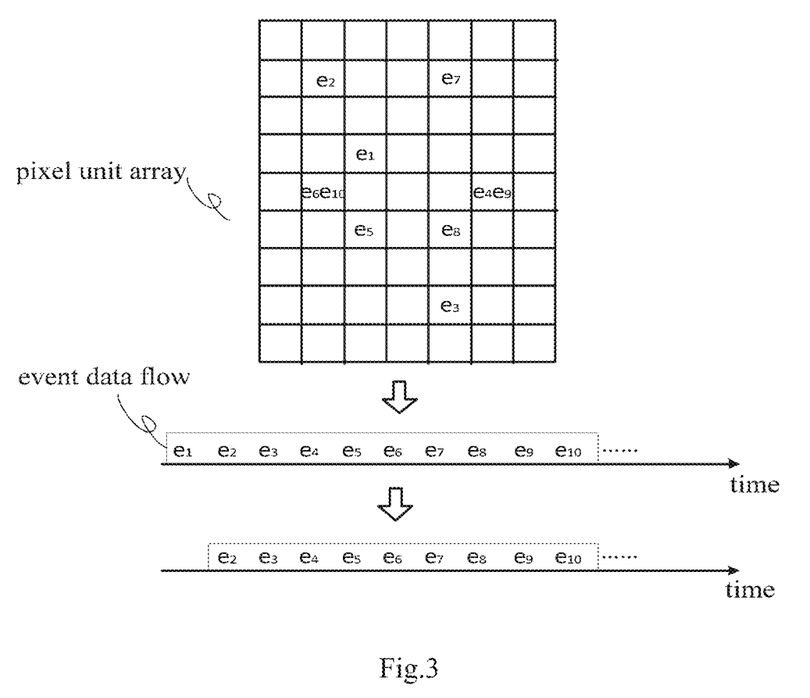
FIG. 3 is a schematic view showing the output of an event data flow by a DVS according to one embodiment of the present disclosure.

As shown in FIG. 2, the method 200 includes the following steps. Step 210: acquiring an event data flow with a predetermined duration from a DVS, the event data flow including a coordinate position and a timestamp of a triggered event. FIG. 3 is a schematic view showing the event data flow outputted by the DVS. As shown in FIG. 3, a 9*7 matrix represents a pixel unit array in the DVS (it should be appreciated that, the matrix in FIG. 3 is for illustrative purpose only, and in actual use, the pixel unit array in the DVS is far greater than the size in FIG. 3). When brightness of a certain pixel unit in the array has changed, corresponding event data e may be triggered to be generated, and a coordinate position of the triggered event may be just a coordinate position of the pixel unit, where $e_i$ represents an $i^{th}$ triggered event (i=1, 2, 3, . . . ). As shown in FIG. 3, with the elapse of time, the DVS may output the event data $e_1$, $e_2$, $e_3$, $e_4$, . . . sequentially, so as to form an event data flow. Each event data $e_i$ may include the coordinate position and the timestamp of the triggered event, i.e., the event data $e_i$ may be represented as $e_i=(x_i, y_i, t_i)$, where $(x_i, y_i)$ represents a coordinate position of the $i^{th}$ triggered event, and $t_i$ represents a timestamp of the $i^{th}$ triggered event. A timestamp of an event triggered later may be greater than a timestamp of an event triggered previously, e.g., $t_2>t_1$.

FIG. 3 also shows the event data flow with the predetermined duration from the DVS, and $e_{start}$ and $e_{end}$ represent events corresponding to a start time point and an end time point respectively. In FIG. 3, $e_{start}=e_2$ and $e_{end}=e_{10}$. In the embodiments of the present disclosure, the event data flow with the predetermined duration may be acquired at a regular interval, and the duration of the acquired event data flow will not be particularly defined herein.

In addition, FIG. 3 further shows that there is more than one event data, e.g., $e_6$, $e_{10}$, at a certain coordinate position. It means that, the pixel unit at this coordinate position is triggered at a time point $t_6$ to generate an event $e_6$, and then triggered at a time point $t_{10}$ to generate an event $e_{10}$. In this regard, a same coordinate position may correspond to two, three or more timestamps.

Step S220: generating a timestamp matrix in accordance with the coordinate position and the timestamp of the triggered event. To be specific, the plurality of pieces of event data in the acquired event data flow may be filled into a timestamp matrix in accordance with the corresponding coordinate positions in a chronological order of triggering time (i.e., values of the timestamps).

A specific process of generating the timestamp matrix will be described hereinafter, and the process may include the following steps 1) to 3).

1) At first, a timestamp matrix with a predetermined size may be created, and the predetermined size of the timestamp matrix may be determined in accordance with a size of the pixel unit array in the DVS. In a possible embodiment of the present disclosure, the timestamp matrix shall contain all the pixel units in the array in the DVS. In the embodiments of the present disclosure, the timestamp matrix may be of a size equal to the pixel unit. When the pixel unit array has a size of 768*640, the created timestamp matrix may also have a size of 768*640.

2) The timestamp matrix may be initialized with zero values to acquire an initialized timestamp matrix.

3) The coordinate position of the triggered event in the acquired event data flow with the predetermined duration may be searched in the initialized timestamp matrix, and then the timestamp of the triggered event may be written to the searched coordinate position to acquire the timestamp matrix. To put it simply, the values of the timestamps of the event data acquired in Step S210 may be filled into the initialized timestamp matrix sequentially in a chronological order of the triggering times of the events.

As mentioned hereinabove, the pixel unit at a same coordinate position may be triggered many times to generate a plurality of events. In this case, during the generation of the timestamp matrix, more than one values of the timestamps may correspond to the same coordinate position in the timestamp matrix. Hence, two following modes for writing the timestamps or filling the timestamp matrix will be provided in the embodiments of the present disclosure.

Figure 4A:
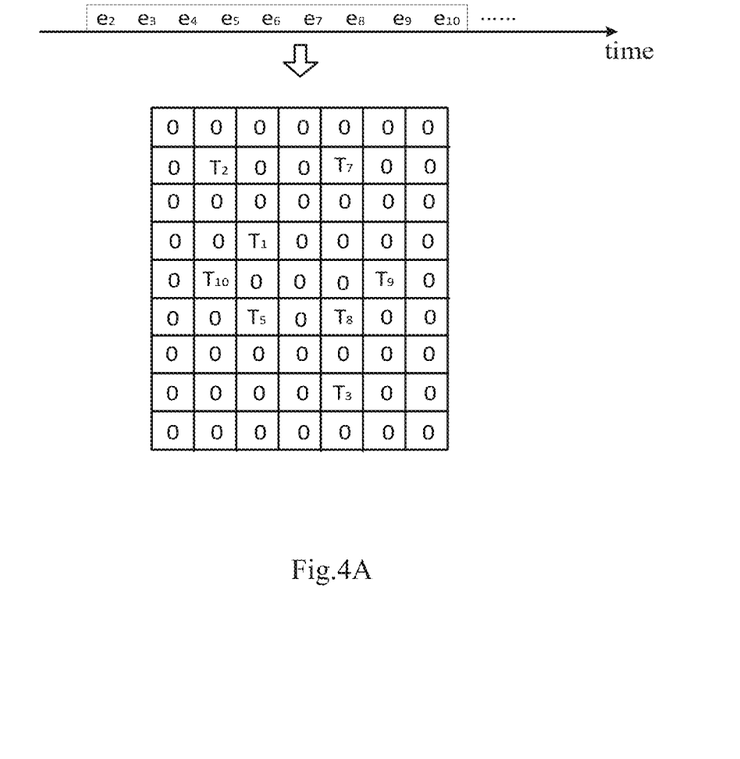
FIG. 4A is a schematic view showing a timestamp matrix according to one embodiment of the present disclosure.

In a possible embodiment of the present disclosure, when one coordinate position in the event data flow corresponds to a plurality of timestamps, a timestamp with a maximum value in the plurality of timestamps may be written to the coordinate position. In other words, when an event $e_m$ and an event $e_n$ correspond to a same coordinate position, a value of a later timestamp may be reserved in the timestamp matrix. FIG. 4A shows the timestamp matrix according to one embodiment of the present disclosure, where $e_2, e_3, \ldots, e_{10}$ are the event data flow generated in FIG. 3, and the timestamp matrix still has a size of 9*7.

Figure 4B:
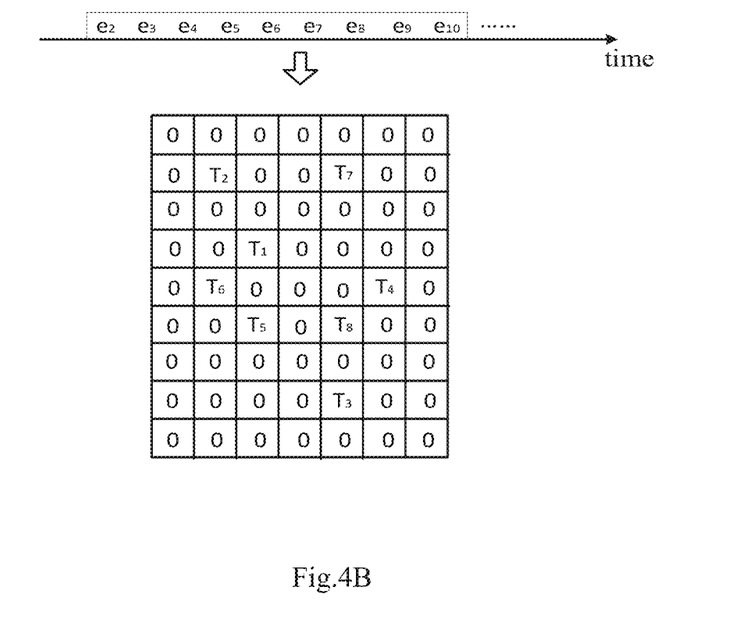
FIG. 4B is another schematic view showing the timestamp matrix according to one embodiment of the present disclosure.

In another possible embodiment of the present disclosure, when one coordinate position in the event data flow corresponds to a plurality of timestamps, a timestamp with a minimum value in the plurality of timestamps may be written to the coordinate position. In other words, when an event $e_m$ and an event $e_n$ correspond to a same coordinate position, a value of an earlier timestamp may be reserved in the timestamp matrix. FIG. 4B shows another timestamp matrix according to one embodiment of the present disclosure, where $e_2, e_3, \ldots, e_{10}$ are the event data flow generated in FIG. 3, and the timestamp matrix still has a size of 9*7.

Through comparing FIG. 4A with FIG. 4B, in the timestamp matrix generated in FIG. 4A, a timestamp value $T_{10}$ may be written to a coordinate position (4,1) (i.e., a $5^{th}$ row and a $2^{nd}$ column) and a timestamp value $T_9$ may be written to a coordinate position (4,5) (i.e., the $5^{th}$ row and a $6^{th}$ column); while in the timestamp matrix generated in FIG. 4B, a timestamp value $T_6$ may be written to the coordinate position (4,1) and a timestamp value $T_4$ may be written to the coordinate position (4,5).

Instances of the timestamp matrix have been given hereinabove. In actual use, any one of them may be selected. The mode of writing the timestamp will not be particularly defined herein, as long as the timestamp matrix is generated in accordance with the triggering time of the event.

Step S230: scanning elements in the timestamp matrix in a predetermined scanning direction, so as to determine at least one intermediate point in each element in accordance with a value and a gradient of the element in the predetermined scanning direction.

Figure 5:
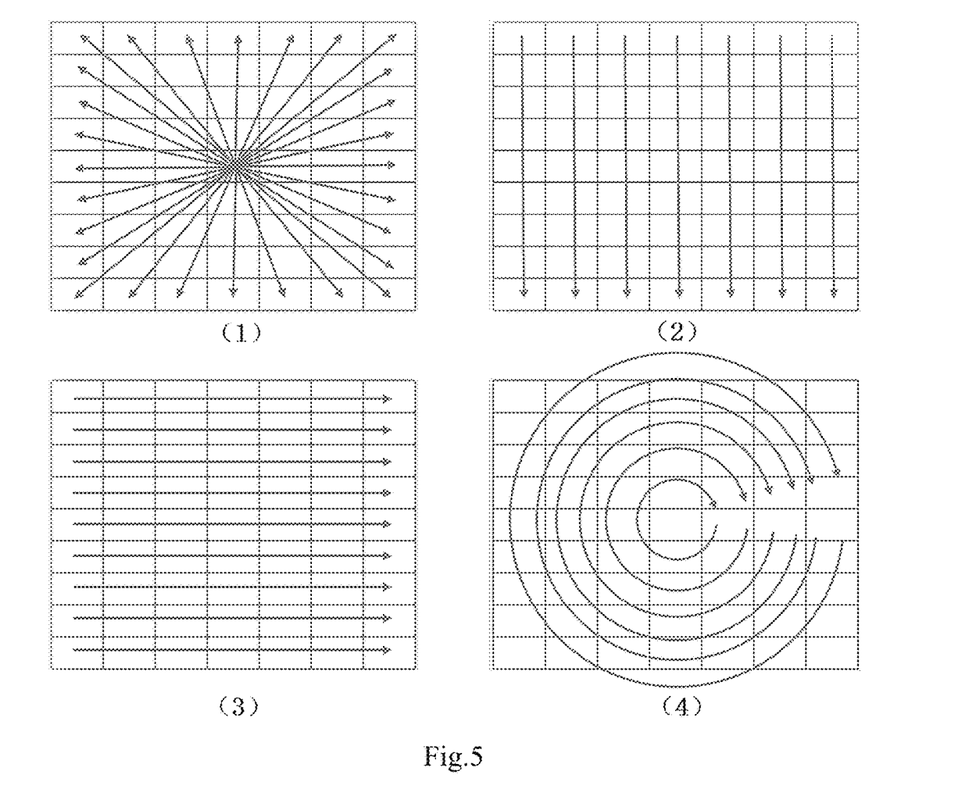
FIG. 5 is a schematic view showing predetermined scanning directions for the timestamp matrix according to one embodiment of the present disclosure.

In the embodiments of the present disclosure, the predetermined scanning direction may be determined in accordance with a movement direction of an object in a field of view, and include a horizontal scanning direction, a vertical scanning direction, a perspective scanning direction and a rotational scanning direction. FIG. 5 is a schematic view showing several predetermined scanning directions for the timestamp matrix. In FIG. 5, (1) represents the perspective scanning direction, (2) represents the vertical scanning direction, (3) represents the horizontal scanning direction, and (4) represents the rotational scanning direction. Taking (1) as an example, each line with an arrow represents one scanning line, and a direction indicated by the arrow represents a scanning direction. The perspective scanning direction in (1) may be a direction from a center point to a circumference. Of course, apart from the scanning direction in (1), the perspective scanning direction may also be a direction from the circumference to the center point. Identically, the vertical scanning direction in (2) may be a direction from up to down, or from down to up. The horizontal scanning direction and the rotational scanning direction will not be particularly defined herein. The predetermined scanning directions in FIG. 5 are for illustrative purposes only. The predetermined scanning direction may be determined through predicting an approximate movement direction of the object in the field of view. For example, when the object moves close to or away from a target (e.g., the DVS) in the field of view, the predetermined scanning direction may be the perspective scanning direction; when the object moves horizontally in the field of view, the predetermined scanning direction may be the horizontal scanning direction; when the object moves vertically in the field of view, the predetermined scanning direction may be the vertical scanning direction; and when the object moves rotationally (e.g., moves in circles) in the field of view, the predetermined scanning direction may be the rotational scanning direction. The predetermined scanning direction may also be determined according to the practical need. For example, in security and protection, usually the horizontal scanning direction may be selected, and in automatic driving, usually the perspective scanning direction may be selected.

After determining the scanning direction, the elements in the timestamp matrix may be scanned in the predetermined scanning direction using the scanning line. In addition, the gradient of each scanned element may be calculated one by one in the scanning direction in accordance with the value of the scanned element. When the value and/or gradient of the scanned element meets a predetermined condition, the scanned element may be determined as an intermediate point. In the embodiments of the present disclosure, the elements may be scanned and tracked one by one along each scanning line, and the gradient of each scanned element on the scanning line may be calculated. When a product of the gradient of the scanned element and a gradient of an adjacent element is smaller than zero, the scanned element may be determined as a first intermediate point (also called as a gradient turning point). In addition, the value of each scanned element may also be recorded. When the value of the scanned element is not equal to zero and a value of the adjacent element is equal to zero, the scanned element may be determined as a second intermediate point (also called as a near-zero point). When the scanned element is a last element on the scanning line, the scanning operation may be ended. The above steps may be performed with respect to all the scanning lines, until the elements in the entire timestamp matrix have been scanned. At this time, a plurality of first intermediate points and second intermediate points may be acquired, and all of them may be marked as intermediate points.

When determining whether the scanned element meets the predetermined condition, the following formulae may be used. When a $k^{th}$ scanned element meets one of the following predetermined conditions, the $k^{th}$ scanned element may be determined as an intermediate point: $gradient_{k-1} * gradient_k < 0$, $Amplitude_{k-1} \equiv 0$ and $Amplitude_k \neq 0$, and $Amplitude_{k-1} \neq 0$ and $Amplitude_k \equiv 0$.

In these formulae, $gradient_k$ represents a gradient of the $k^{th}$ scanned element, $gradient_{k-1}$ represents a gradient of a $(k-1)^{th}$ scanned element, $Amplitude_k$ represents a value of the $k^{th}$ scanned element, and $Amplitude_{k-1}$ represents a value of the $(k-1)^{th}$ scanned element. In the embodiments of the present disclosure, the gradient of the scanned element may be calculated through a forward or backward differentiation formula, and the value of the scanned element may be the timestamp value in the timestamp matrix. The calculation of the gradient is known to a person skilled in the art, and thus will not be particularly defined herein. Any method for calculating the gradient may be combined with the embodiments of the present disclosure, so as to implement the method 200.

Figure 6:
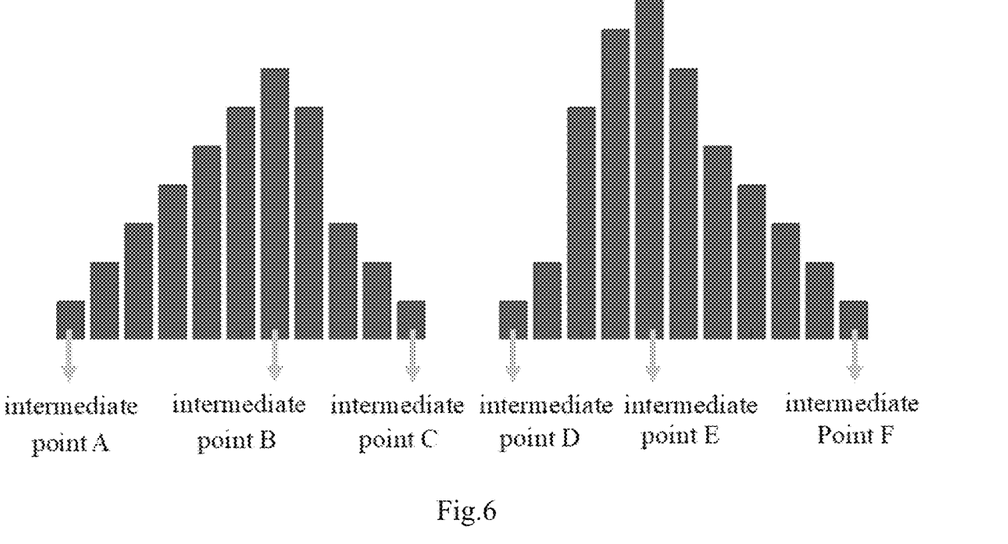
FIG. 6 is a schematic view showing intermediate points in the timestamp matrix according to one embodiment of the present disclosure.

In order to further describe how to determine the intermediate point, FIG. 6 is a schematic view showing the intermediate point in the timestamp matrix. FIG. 6 shows the scanned elements along the scanning line in the form of a bar chart, where each bar represents on scanned element. A length of each bar represents a value of the scanned element, and the longer the bar, the larger the value. FIG. 6 shows a part of the timestamp matrix (i.e., scanning results on one scanning line). A value of a first scanned element is 0, a second scanned element is just a near-zero point, i.e., an intermediate point A, an intermediate point B is a gradient turning point, intermediate points C and D are each a near-zero point, an intermediate point E is a gradient turning point, and an intermediate point F is a near-zero point.

Step S240: calculating a distance between adjacent intermediate points and a gradient direction, and generating an optical flow matrix in accordance with a calculation result.

At first, the distance between the adjacent intermediate points and the gradient direction may be calculated to acquire a value of each intermediate point.

In the embodiments of the present disclosure, two adjacent intermediate points without any zero point therebetween (the zero point is a point where the value of the element in the timestamp matrix is zero) may be selected as an intermediate point pair. Next, with respect to each intermediate point pair, a distance between the two intermediate points in the intermediate point part may be calculated in accordance with coordinate positions of the two intermediate points, the gradient direction of the intermediate point pair may be calculated, and a gradient symbol value may be determined in accordance with the gradient direction. In the embodiments of the present disclosure, when the gradient direction is greater than zero, the gradient symbol value may be +1, and when the gradient direction is smaller than zero, the gradient symbol value may be −1. The calculation of the distance between two coordinate positions and the determination of the gradient direction in accordance with the gradient are known in the art, and thus will not be particularly defined herein. Then, a product of the distance between the two intermediate points in the intermediate point pair and the gradient symbol value may be taken as a value of the two first intermediate points in the intermediate point pair.

Referring to FIG. 6 again, the intermediate point A and the intermediate point B forms an intermediate point pair. A distance $d_{AB}$ between the two intermediate points in the intermediate point pair may be calculated. When a coordinate position of the intermediate point A is $(x_a, y_a)$ and a coordinate position of the intermediate point B is $(x_b, y_b)$, $d_{AB}=\sqrt{(x_a-x_b)^2+(y_a-y_b)^2}$. In FIG. 6, the values of the scanned elements from the intermediate point A to the intermediate point B increase monotonically, so the gradient symbol value of the intermediate point pair may be simply marked as $s_{AB}=+1$. In this regard, a value $v_{AB}$ of the intermediate point A (or the intermediate point B) may be acquired through $d_{AB}*s_{AB}$. Identically, a value of the intermediate point B and the intermediate point C, a value of the intermediate point D and the intermediate point E, and a value of the intermediate point E and the intermediate point F may be calculated. There is a zero point between the intermediate point C and the intermediate point D, so they may not form an intermediate point pair.

Then, the optical flow matrix may be generated in accordance with the values of the intermediate points.

In the embodiments of the present disclosure, the optical flow matrix with a same size as the timestamp matrix acquired in Step S220 may be generated (e.g., as mentioned hereinabove, the optical flow matrix may have a size of 768*640), and then the optical flow matrix may be initialized with zero values to acquire the initialized optical flow matrix. Next, the coordinate position of each intermediate point may be searched in the initialized optical flow matrix, and the value of the corresponding intermediate point may be written to the searched coordinate position to generate the optical flow matrix.

A specific procedure of generating the optical flow matrix will be described hereinafter.

(1) An optical flow matrix with a same predetermined size as the timestamp matrix may be created. The predetermined size may be determined in accordance with the size of the pixel unit array in the DVS.

(2) The optical flow matrix may be initialized with zero values to acquire an initialized optical flow matrix.

(3) Coordinate positions of two intermediate points in each intermediate point pair may be searched in the initialized optical flow matrix, and then the value of the two intermediate points may be written to the searched coordinate positions of the two intermediate points and coordinate positions between the two intermediate points. Taking the intermediate points A and B in FIG. 6 as an example again, the coordinate positions $(x_a, y_a)$ and $(x_a, y_b)$ may be searched in the initialized optical flow matrix, and a value $v_{AB}$ may be assigned to the two coordinate positions. In addition, the value $v_{AB}$ may also be assigned to the elements between the two coordinate positions. Next, all the intermediate points may be traversed so as to acquire the optical flow matrix. In some embodiments of the present disclosure, a certain intermediate point may be used to form more than one intermediate point pair. In this case, when generating the optical flow matrix in accordance with the calculation result of the intermediate point pair, it is merely necessary to assign one value to the coordinate position of the intermediate point. The value may be assigned in accordance with the calculation result of any intermediate point pair, which will not be particularly defined herein.

In order to describe the procedure of generating the optical flow matrix in accordance with the timestamp matrix in a better manner, Table 1 shows a part of one timestamp matrix.

TABLE 1

Example of timestamp matrix

| 0 | 23 | 9 | 0 | 27 | 0 |
| 0 | 24 | 0 | 4 | 5 | 6 |
| 14 | 15 | 35 | 34 | 33 | 0 |

The timestamp matrix in Table 1 may be scanned in the horizontal scanning direction from left to right, so as to acquire a plurality of intermediate points, e.g., the elements having values of 23, 9, 27, 24, 4, 6, 14, 35 and 33 (here, non-zero elements at the periphery may be taken as the intermediate points, which will not be particularly defined herein). A distance between two intermediate points and a gradient direction may be calculated, and then the optical flow matrix may be generated in accordance with a calculation result. Here, in order to simplify the calculation process, the quantity of elements between the adjacent intermediate points may be used to represent the distance therebetween. For example, a distance between a second element having a value of "23" and a third element having a value of "9" in a first row is 2. A change tendency of the values of the elements between the adjacent intermediate points may be used to represent the gradient symbol value of the intermediate point (when the values of the elements between the adjacent intermediate points increases gradually, the gradient symbol value may be +1, and otherwise, it may be −1). For example, the gradient symbol value of each of the second element having a value of "23" and the third element having a value of "9" in the first row may be −1. In this regard, in the initialized optical flow, values corresponding to the second element having a value of "23" and the third element having a value of "9" in the first row may be −2, as shown in Table 2.

A fourth element in the first row has a value of "0", so the third element having a value of "9" and a fifth element having a value of "27" in the first row do not form an intermediate point pair. At this time, it is unnecessary to calculate the distance and the gradient symbol value of the two elements, and the values corresponding to the two elements in the optical flow matrix may be maintained as 0 (in some embodiments of the present disclosure, in order to differentiate the near-zero points from each other, 1 may be assigned to the fifth element in the first row, as shown in Table 3, which will not be particularly defined herein). Especially, a third element having a value of "35" in a third row may form an intermediate point pair with a first element having a value of "14" in the third row, and form another intermediate point pair with a fifth element having a value of "33" in the third row. In addition, the value of the intermediate point corresponding to the third element in the third row calculated in accordance with the former intermediate point pair in the predetermined scanning direction may be 3, and its value calculated in accordance with the latter intermediate point pair may be −2. At this time, the value acquired in accordance with the former intermediate point pair may be assigned to the third element in the third row in the optical flow matrix. Table 2 and Table 3 show two types of optical flow matrices acquired after calculation respectively.

TABLE 2

Example of optical flow matrix

| 0 | −2 | −2 | 0  | 0  | 0 |
| 0 | 0  | 0  | 3  | 3  | 3 |
| 3 | 3  | 3  | −2 | −2 | 0 |

TABLE 3

Example of ptical flow matrix

| 0 | −2 | −2 | 0  | 1  | 0 |
| 0 | 1  | 0  | 3  | 3  | 3 |
| 3 | 3  | 3  | −2 | −2 | 0 |

It should be appreciated that, several modes for generating the optical flow matrix in accordance with the calculation result of each intermediate point in the timestamp matrix have been described hereinabove briefly. Any mode of calculating an optical flow vector shall fall within the scope of the present disclosure, as long as vector tracking is capable of being performed on the timestamp matrix in the predetermined scanning direction.

According to the optical flow calculation scheme in the embodiments of the present disclosure, the timestamp matrix may be generated in accordance with the event data flow, the timestamp matrix may be scanned (vector tracking) in the predetermined scanning direction, the distance between the adjacent intermediate points and the gradient direction may be calculated, and then the optical flow matrix may be generated in accordance with the calculation result. In other words, the optical flow matrix may be calculated merely through traversing the elements in the timestamp matrix. As a result, it is unnecessary to perform a local, complex plane-fitting calculation process for pixels as compared with a conventional method, thereby to improve the operability and the real-time performance.

It should be appreciated that, although with a large number of details, these specific details are not necessary for the implementation of the present disclosure. In some embodiments of the present disclosure, the known method, structure or technology is not shown, so as to facilitate the understanding of the present disclosure in a better manner.

It should be further appreciated that, sometimes the features of the present disclosure are described in conjunction with a single embodiment or figure, so as to facilitate the understanding of one or more aspects of the present disclosure. However, the method in the present disclosure shall not be construed as to reflect the intention that the present disclosure asks for more features than those specified in each claims. More definitely, as reflected in the appended claims, the creative aspect lies in the features less than all the features in the above-mentioned single embodiment. Hence, each claim following a specific embodiment may be definitely incorporated into the specific embodiment, and each claim itself may serve as an individual embodiment of the present disclosure.

It should be further appreciated that, modules, units or components in the above examples may be arranged in the device described in the embodiments, or in one or more devices different from the device. The modules may be combined into one module, or each module may be divided into a plurality of submodules.

It should be further appreciated that, the modules may be modified adaptively and arranged in one or more devices different from that mentioned hereinabove. The modules, units or components may be combined into one module, unit or component, or each module, unit or component may be divided into a plurality of submodules, subunits or subcomponents. Apart from the features, processes or units conflicting with each other, all the features, processes or units involved in the specification (including the appended claims, abstract and drawings) may be combined in any form. Unless otherwise defined, each feature in the specification (including the appended claims, abstract and drawings) may be replaced with a same, equivalent or similar feature.

In addition, it should be appreciated that, although some embodiments include some features in the other embodiments, the combination of the features in different embodiments may also fall within the scope of the present disclosure. For example, the features in the appended claims may be combined in any form.

In addition, some of the embodiments have been described as a combination of methods or method elements capable of being implemented by a processor of a computer system or any other device. Hence, the processor including necessary instructions for implementing the methods or the method elements may be used to form a device for implementing the methods or the method elements. In addition, the device is used to achieve functions of the elements.

Unless otherwise defined, such ordinal numerals as "first", "second" and "third" are merely used to differentiate different components rather than to represent any order, number or importance.

Although with the above embodiments, a person skilled in the art may obtain the other embodiments, which also fall within the scope of the present disclosure. In addition, it should be appreciated that, the words are selected in the present disclosure principally for readability and guidance, but shall not be construed as limiting the scope of the present disclosure. Obviously, a person skilled in the art may make further modifications and improvements without departing from the spirit of the present disclosure. The above description is for illustrative but not restrictive purposes, and the scope of the present disclosure shall be subject to the appended claims.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An optical flow calculation method for a computing device, comprising:
   acquiring an event data flow with a predetermined duration from a Dynamic Vision Sensor (DVS), the event data flow comprising a coordinate position and a timestamp of a triggered event;
   generating a timestamp matrix in accordance with the coordinate position and the timestamp of the triggered event;
   scanning elements in the timestamp matrix in a predetermined scanning direction, so as to determine at least one intermediate point in each element in accordance with a value and a gradient of the element in the predetermined scanning direction; and
   calculating a distance between adjacent intermediate points and a gradient direction, and generating an optical flow matrix in accordance with a calculation result,
   wherein the generating the timestamp matrix in accordance with the coordinate position and the timestamp of the triggered event comprises: creating a timestamp matrix with a predetermined size, the predetermined size being determined in accordance with a size of a pixel unit array of the DVS; initializing the timestamp matrix with zero values to acquire an initialized timestamp matrix; searching the coordinate position of the triggered event in the initialized timestamp matrix; and writing the timestamp of the triggered event to the searched coordinate position to acquire the timestamp matrix and wherein the predetermined scanning direction is determined in accordance with a movement direction of an object in a field of view, and comprises a horizontal scanning direction, a vertical scanning direction, a perspective scanning direction and a rotational scanning direction.

2. The optical flow calculation method according to claim 1, wherein the determining the at least one intermediate point in each element in accordance with the value and the gradient of the element in the predetermined scanning direction comprises: calculating the gradient of each scanned element in accordance with the value of the scanned element one by one in the predetermined scanning direction; and determining the scanned element as the intermediate point when the value and/or gradient of the scanned element meets a predetermined condition.

3. The optical flow calculation method according to claim 2, wherein the generating the optical flow matrix in accordance with the calculation result comprises: creating an optical flow matrix with a predetermined size; initializing the optical flow matrix with zero values to acquire an initialized optical flow matrix; searching a coordinate position of the intermediate point in the initialized optical flow matrix; and writing a value of the corresponding intermediate point to the searched coordinate position to generate the optical flow matrix.

4. The optical flow calculation method according to claim 3, wherein the determining the scanned element as the intermediate point when the value and/or gradient of the scanned element meets the predetermined condition comprises: determining the scanned element as a first intermediate point when a product of the gradient of the scanned element and a gradient of an adjacent element is smaller than zero; determining the scanned element as a second intermediate point when the value of the scanned element is not equal to zero and a value of the adjacent element is equal to zero; and marking the first intermediate point and the second intermediate point as intermediate points.

5. The optical flow calculation method according to claim 4, wherein the calculating the distance between the adjacent intermediate points and the gradient direction comprises: selecting two adjacent intermediate points without any zero point therebetween as an intermediate point pair; with respect to each intermediate point pair, calculating a distance between the two intermediate points in accordance with coordinate positions of the two intermediate points; calculating the gradient direction of the intermediate point pair and determining a gradient symbol value in accordance with the gradient direction; and determining a product of the distance between the two intermediate points in the intermediate point pair and the gradient symbol value as a value of the two intermediate points in the intermediate point pair.

6. The optical flow calculation method according to claim 5, wherein the generating the optical flow matrix in accordance with the calculation result further comprises: creating an optical flow matrix with a predetermined size; initializing the optical flow matrix with zero values to acquire an initialized optical flow matrix; searching coordinate positions of two intermediate points in an intermediate point pair in the initialized optical flow matrix; and writing a value of the two intermediate points to the searched coordinate positions of the two intermediate points and a coordinate position between the two intermediate points.

7. The optical flow calculation method according to claim 6, wherein the writing the timestamp of the triggered event to the searched coordinate position comprises, when one coordinate position corresponds to a plurality of timestamps in the event data flow, writing the timestamp in the plurality of timestamps with a maximum value to the coordinate position.

8. The optical flow calculation method according to claim 6, wherein the writing the timestamp of the triggered event to the searched coordinate position comprises, when one coordinate position corresponds to a plurality of timestamps in the event data flow, writing the timestamp in the plurality of timestamps with a minimum value to the coordinate position.

9. The optical flow calculation method according to claim 8, wherein the determining the gradient symbol value in accordance with the gradient direction comprises: when the gradient direction is greater than zero, determining that the gradient symbol value is +1; and when the gradient direction is smaller than zero, determining that the gradient symbol value is −1.

10. A computing device, comprising one or more processors, a memory, and one or more programs stored in the memory and executed by the one or more processors, wherein the one or more programs comprise instructions for implementing the optical flow calculation method according to claim 9.

11. A non-transitory computer-readable storage medium storing therein one or more programs comprising instructions, wherein the instructions are executed by a computing device so as to implement the optical flow calculation method according to claim 9.

* * * * *